July 20, 1954    W. F. ALLER    2,683,983
GAUGING DEVICE FOR BEARINGS
Filed July 22, 1950    2 Sheets-Sheet 1
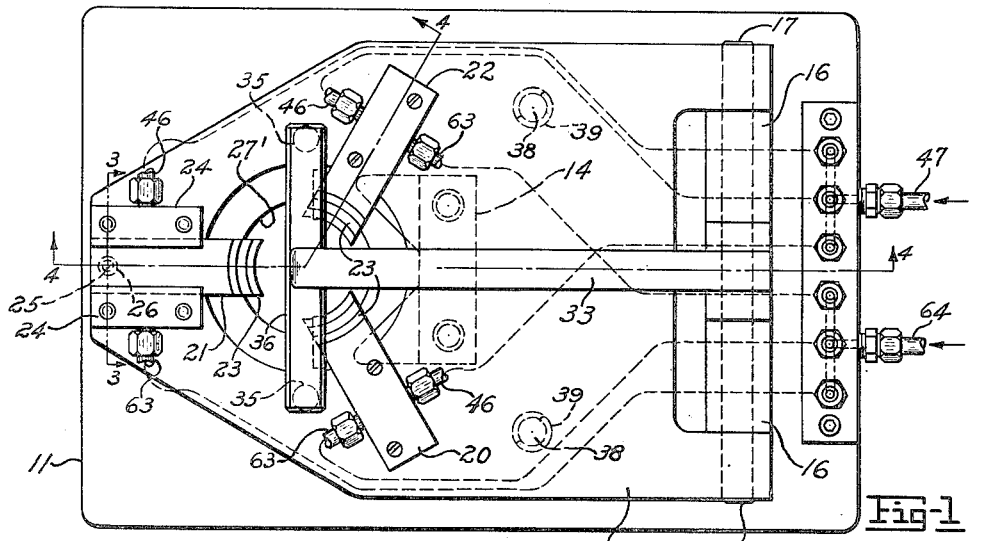
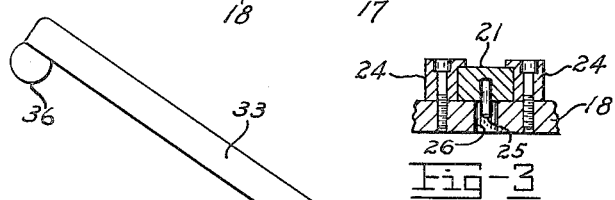
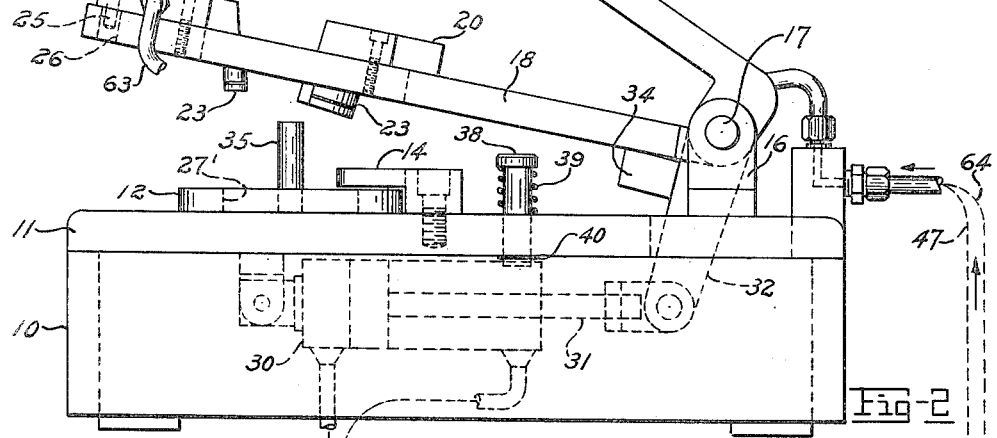
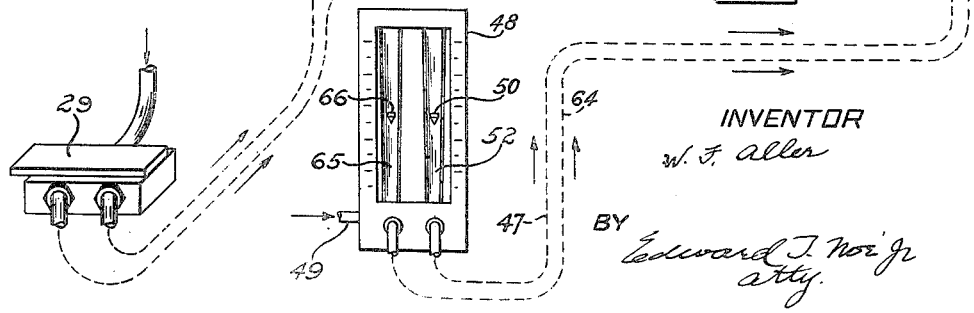
INVENTOR
W. F. Aller
BY Edward T. Noe Jr.
atty.

July 20, 1954
W. F. ALLER
2,683,983
GAUGING DEVICE FOR BEARINGS
Filed July 22, 1950
2 Sheets-Sheet 2
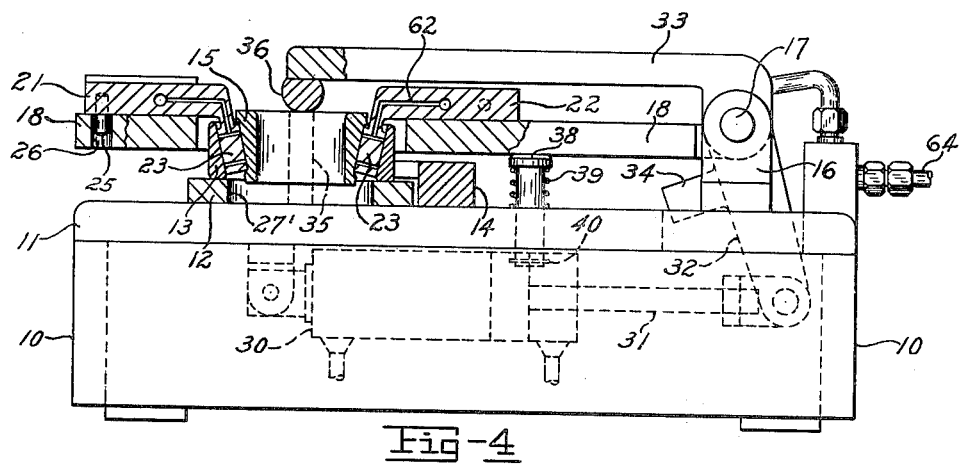
Fig-4
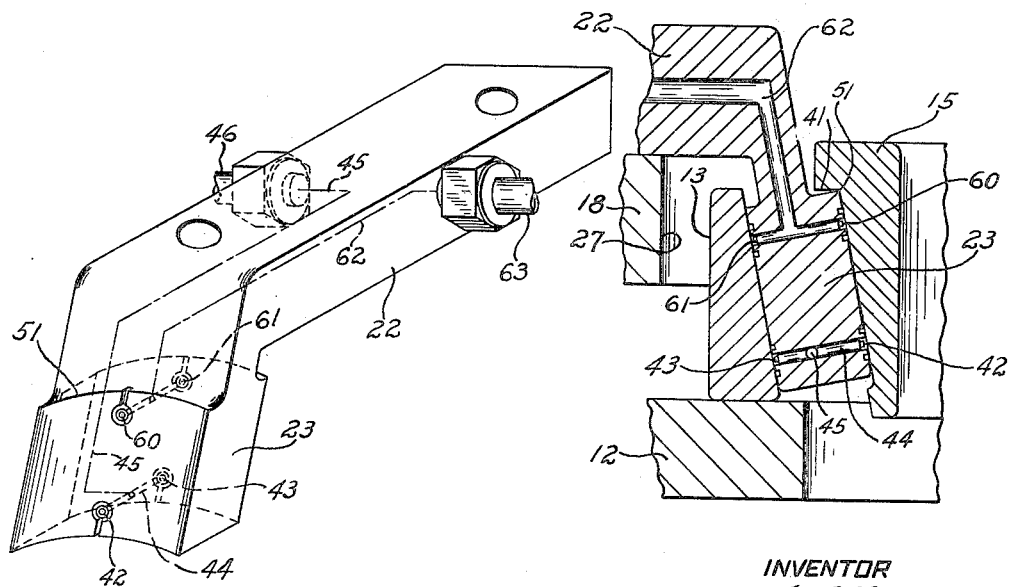
Fig-5
Fig-6
INVENTOR
W. F. Aller
BY Edward J. Noé Jr.
atty Patented July 20, 1954

2,683,983

UNITED STATES PATENT OFFICE 2,683,983

GAUGING DEVICE FOR BEARINGS

Willis Fay Aller, Dayton, Ohio, assignor to The Sheffield Corporation, Dayton, Ohio, a corporation of Ohio Application July 22, 1950, Serial No. 175,461

11 Claims. (Cl. 73—37.5)

This invention relates to the gauging of parts intended for cooperative association with one another and to apparatus for gauging such parts with respect to one another.

One object of the invention resides in apparatus for gauging tapered bearing races or the like, wherein the races are relatively moved, one generally towards the other, until they assume that concentric relation in which they are associated in normal usage, and then the average radial spacing between the inner and outer races is measured to determine the proper size antifriction members that should be assembled with the races gauged.

Another object resides in apparatus of the character mentioned in which the average transverse space between the concentrically arranged inner and outer races of a roller bearing is found by measuring the amount of air leakage taking place from spaced gauging heads which are located between the races of the gauging apparatus.

Another object is the provision of a gauging apparatus for tapered cooperating parts, employing a plurality of gauging heads associated with holding devices which locate the cooperating parts in a proper normal relationship one within the other.

Another object is the provision of a gauging apparatus of the character mentioned having a support for holding and locating one of the races of a roller bearing or the like and having a movable carrier for the other race so that the races may be relatively moved in a generally axial direction into a predetermined relationship, the gauging device having stop means for definitely positioning an end of the inner race with respect to an opposed end of the outer race to locate the races in the positions in which they normally operate.

Another object is the provision in a gauging apparatus of the character mentioned of a gauging arm provided with a carrier gauging head having fluid leakage passages the ends of which cooperate with the inner and outer races of a roller bearing so that the transverse space between the races can be determined.

Another object is the provision of a gauging apparatus of the character mentioned, having gauging heads adapted for positioning between inner and outer concentrically arranged cooperating parts during a gauging operation, the gauging heads having fluid leakage control devices spaced apart in a direction axially of the races and independently connected to gauging means to determine the average transverse spacing between the races at different locations from an end of the races.

Other objects and advantages of the invention will be apparent from the following description, the appended claims, and the accompanying drawing, in which Fig. 1 is a top plan view of a gauging apparatus embodying the present invention with the upper carrier shown in its lowered position;

Fig. 2 is a side elevation of the gauging apparatus shown with its connections to indicating and control devices with which it is associated, the upper carrier being shown in its raised position;

Fig. 3 is a section on the line 3—3 of Fig. 1;

Fig. 4 is a side elevation with the upper carrier shown in its depressed position and with a portion of the device shown in section on the line 4—4 of Fig. 1;

Fig. 5 is a radial section on an enlarged scale showing a portion of the inner and outer races in association with one of the gauging heads, in gauging position; and Fig. 6 is a perspective view showing one of the gauging heads, on an enlarged scale.

In accordance with the present invention a pair of cooperating parts intended for assembly or operation with intermediate or associated parts may be gauged so as to accurately determine the average spacing between the inner and outer parts and thus find the proper size of intermediate parts such as antifriction rollers that should be assembled with the gauged parts. In the particular form of the gauging apparatus as herein shown the device is adapted to gauge the average transverse distance between the raceways of inner and outer taper roller bearing races of an antifriction roller bearing to determine the exact size of the rollers that should be assembled and used with the gauged races.

The gauging apparatus, as shown, comprises a base or support 10 having a table 11 provided with a locating ring 12 on which the outer race 13 of a roller bearing may be placed. The ring 12 has a hole 27' as shown in Figs. 1, 2 and 4. A locating V block 14 is mounted on the table 11 and forms an abutment to locate the outer race approximately concentric with the ring 12. The table 11 is provided with brackets 16 carrying a pivot shaft 17. Mounted on the shaft 17 is an upper carrier 18 provided with a plurality of spaced arms 20, 21 and 22 one of which is shown in Fig. 6. These arms terminate in gauging heads 23 which are curved segments that will interfit between the inner and outer raceways with a small radial clearance between the outer and inner conically curved surfaces of the gauging heads and the outer and inner raceways respectively. The two arms 20 and 22 are fixed to the carrier 18 while the arm 21 is guided between retainers or guides 24 on the carrier so that the arm 21 is free to move radially through a limited distance determined by a stop pin 25 projecting downwardly from the arm 21 as shown in Fig. 3 and arranged in a hole 26 in the carrier 18.

Before loading the parts to be gauged the carrier 18 is in an elevated position as shown in Fig. 2 and when in this position the operator can apply an inner race to be gauged to the gauging heads. The inner race 15 will then project down through a hole 27 in the carrier 18. The arm 21 cannot move outwardly except to a limited extent so the end flange of the inner race will rest on the upper ends of the gauging heads 23.

With an inner race arranged on the carrier 18, and an outer race on the ring 12 the operator, through a suitable foot pedal control 29 of any conventional character, controls the supply of fluid from a pressure source to admit fluid to the left hand side of a cylinder 30 located on the support 10. This causes the piston rod 31 to move to the right and operate a control arm 32, see Fig. 2, fixed to a depressing arm 33 which is pivotally mounted on the pivot bar 17. In the position of the parts shown in Fig. 2, when the depressing arm 33 is elevated, a lug 34 on arm 32 holds the upper carrier 18 in raised position. When the arm 32 is moved counterclockwise by supplying fluid to the cylinder 30 the arm 33 is lowered and during the initial lowering movement of the arm, as the lug 34 descends, the carrier 18 descends, thus moving the inner race in a direction generally axial of the outer race into a concentric relationship wth the outer race. The depressing arm 33 then continues its descent until it is stopped by two stop posts 35 fixed on the table 11. The upper ends of these stop posts are contacted by the outer ends of a stop bar 36 fixed on the outer end of the depressing arm 33. The height of the stop posts 35 bears a definite relationship to the particular bearing construction to be gauged, so that the stop bar 36 will press the upper side of the inner race down into a position where it is properly spaced from the lower side of the outer race so as to stimulate operating conditions of the races. This will cause a certain transverse spacing between the inner and outer raceways to correspond precisely to operating conditions of those particular raceways so that by measuring the average transverse spacing between the raceways, in this position, the exact size of antifriction rollers that should be employed with the particular races gauged can be determined without having cumulative errors that might obtain if the inner and outer raceways were gauged independently of one another.

The downward movement of the upper carrier 18 takes place against a pair of spring pressed studs 38 normally held up by springs 39 so that a cross pin 40 in each stud bears against the lower side of the table 11. In the final lowering movement of the upper carrier these studs are depressed by the positive force exerted through the inner race against the gauging heads 23 but the springs 39 hold the gauging heads slightly spaced from the outer raceway since the radial width of the gauging head is slightly less than the normal radial distance between the raceways prevailing under normal operating conditions of the bearing. The flange on the inner race at 41 engages the rim portion 51 of the gauging heads and these portions 41 and 51 are so designed that there will be a small radial clearance between the inner raceway and the inner surface of the gauging heads. It should be understood also that when the stop bar 36 moves the inner race down into gauging position the gauging arm 22 can move inwardly or outwardly to accommodate its gauging head 23 to the space between the races and at the same time the three gauging heads 23 acting collectively will centralize the inner and outer races, causing any requisite shifting of the outer race on the holding ring 12 for proper centralization of the races. The location of the V block 14 is such as to permit some small shifting of the outer race since the purpose of the V block is merely to roughly locate the outer race in a position where the descending gauging heads 23 will enter the outer race.

It will be understood that after a gauging operation, as will be presently described, the operator by controlling the foot pedal 29 may cause pressure fluid to enter the opposite end of the cylinder 30 and move the piston rod and the arm 32 towards the left as viewed in Fig. 4, thus raising the depressing arm 33. The arm 32 will carry the upper carrier 18 upwardly when its lug 34 comes in contact with the carrier. The inner race can then be removed from the upper carrier and the outer race removed from the holding ring 12 and new races to be gauged can be substituted.

The average transverse spacing between the inner and outer raceways to be gauged, as herein shown, is measured or gauged by observing the amount of air leakage taking place between gauging nozzles on the gauging heads and the surfaces of the inner and outer raceways. As will be noted from Figs. 5 and 6 for example, each gauging head 23 has a pair of opposed gauging nozzles 42 and 43 recessed preferably a few ten-thousandths of an inch below the adjacent surfaces of the gauging head. These nozzles communicate with one another through a passage 44 which connects to a passage 45 leading to a tube 46. The several tubes 46 of the several gauging arms are connected to a common air supply tube 47 as indicated in Fig. 1. This tube 47 is supplied with air under pressure coming from a flow measuring gauging device 48 which is supplied with air under constant pressure from a tube 49. As shown somewhat diagrammatically the gauge 48 measures the amount of air flowing up through an upwardly flaring tube 52 containing a float 50, the height of which depends upon the rate of air flow. It should be understood however that any suitable device for measuring air flow can be used. By comparing the indication obtained on the gauging device when master races of known size are in place on the gauge with the indication obtained for any particular pair of cooperating raceways, the size of the roller to be employed can be accurately determined since the total air leakage taking place between the several nozzles 42 and 43 measures the average radial spacing between the raceways.

While the air gauging nozzles 42 and 43 may be arranged in the gauging heads so that the measurement of the radial clearance is obtained substantially midway between the ends of the races, it is preferred, as shown, to take two measurements of the radial spacing between the raceways at two different positions axially spaced apart in order that the gauge may show deviations from the proper taper as well as the average spacing between the raceways. In addition to the gauging nozzles 42 and 43 on each of the gauging heads, there is therefore another pair of gauging nozzles 60 and 61 connected to a common passageway 62 leading to a supply tube 63. The several supply tubes 63 of the several gauging arms are connected together to a common supply tube 64 leading to another air measuring gauge 65, similar to the gauge 52, and having a float 66. The level of the float 66 indicates on a calibrated scale just what the average radial spacing is between the raceways at the gauging zone near the larger end of the inner race. The level of the float 50 indicates the radial spacing near the larger end of the outer race and if the angle of taper of the inner and outer raceways is exactly the same, the float levels will be exactly the same. A difference in the float levels indicates an error of taper and by calibrating the scales on the gauging devices with masters, the operator is able to see if the taper error is in excess of an allowable limit.

It should be understood that in accordance with the present invention inner and outer races may be selected indiscriminately from a collection of races of approximately the correct size but where the exact size is not known. The two races to be gauged may be placed on the gauging device, the inner raceway brought into a normal concentric position corresponding to the precise position it takes in normal operation with respect to the outer race and the indications of the gauging indicators are then noted to see just what size roller should be employed with those particular races that are gauged. The proper size rollers can then be selected from classified groups of rollers and assembled with the particular races gauged so that the resulting antifriction bearing will have the end of the inner race properly spaced from the opposite end of the outer race with the spacing that corresponds to operating conditions.

While the form of apparatus and the method herein described constitute preferred embodiments of the invention, it is to be understood that the invention is not limited to the precise form of apparatus or method, and that changes may be made therein without departing from the scope of the invention which is defined in the appended claims.

What is claimed is:

1. Gauging apparatus for gauging a dimensional relationship between tapered surfaces of concentrically cooperating parts such as inner and outer taper roller bearing races, comprising a plurality of gauging heads of such size and shape as to substantially interfit between said surfaces when the latter are concentric and in normal operating relation, said heads having fluid passages controlled by said surfaces to provide a measurable leakage of fluid supplied under pressure in accordance with the relative spacing of said surfaces, a carrying member for all of said heads, locating means for abutting an end of one of the parts and locating means for abutting the opposite end of the other part to arrange the tapered surfaces in the relative position they assume in normal operation.

2. A gauging apparatus of the character described for gauging the transverse spacing between inner and outer cooperating tapered parts intended to be concentrically associated comprising a support having holding means arranged for abutting relation with and for locating one of the parts, a movable carrier mounted on said support and adapted to hold the second part, means for mounting said carrier for movement on said support to move the second part generally axial of the first part into the relationship that exists during normal association of the parts, in which a transverse spacing exists between the parts, gauging means arranged between the parts for gauging the transverse spacing, and means supporting said gauging means on said support.

3. A gauging apparatus of the character described comprising a support having means for receiving one side of a tapered bearing race, a carrier operably mounted on said support and having means for receiving a complementary bearing race, means engageable with the side of the complementary race that is axially remote from the said receiving means and means for limiting the travel of said engageable means for stopping said complementary race in a predetermined position with respect to said taper bearing race and in concentric relation therewith, and gauging means located between the races for gauging the distance between the races.

4. A gauging apparatus of the character described comprising a support having a table for receiving an outer race of a roller bearing, a carrier mounted on said support and having means for receiving an inner race, means supporting said carrier for movement on said support, means engageable with one side of the inner race for moving the same with respect to the outer race and in concentric relation with the outer race, means for limiting movement of said engageable means to a definite predetermined position, and air gauging means located between the races for gauging the distance between the races.

5. A gauging apparatus of the character described comprising a support having holding means for locating a tapered annular part to be gauged, a carrier mounted on said support and adapted to hold a second tapered annular part intended for co-operation with the first part, means pivotably supporting said carrier for movement about a fixed axis, said carrier being movable on said axis to bring said parts into that coaxial relationship that exists during normal operation of the parts, said carrier having spaced gauging heads arranged between the parts for gauging the space between the parts.

6. A gauging apparatus of the character described comprising, in combination, means for holding a taper roller bearing race, a plurality of spaced arms terminating in gauging heads adapted to hold a cooperating bearing race, a support for the first holding means, a carrier for said arms movably carried by said support for movement towards the other race on the holding means, means for operating said carrier to bring the races into the concentric relation corresponding to normal operating relation, said gauging heads having a series of fluid passages terminating in fluid leakage orifices controlled by the raceways of the bearing races, and a common fluid flow gauging means connected to said series of fluid passages.

7. A gauging apparatus as set forth in claim 6 in which the gauging heads have a second series of fluid passages terminating in fluid leakage orifices controlled by the raceways, with a second fluid flow gauging means connected to said second series, the fluid leakage orifices of one series being spaced axially of the races with respect to the orifices of the other series to determine the taper relationship of the raceways.

8. A gauging apparatus for gauging a dimensional relationship between tapered surfaces of concentrically cooperating parts such as inner and outer taper roller bearing races comprising a support having holding means for locating one of the parts, a carrier operably connected to said support and having a plurality of spaced arms terminating in gauging heads on which the other part can be placed, means for relatively moving the carrier and the support to cause axial approach of the parts into a predetermined relative position in which they are concentric with one another, said moving means contacting an end of one of the parts and engaging stop means having a definite position with respect to an end of the other of the parts, and means operably connected to said gauging heads for gauging the dimensional relation of the races.

9. A gauging apparatus for gauging a dimensional relation between the raceways of tapered roller bearing races, comprising a support having holding means for the outer race, a carrier pivotally mounted on the support, spaced arms on said carrier terminating in gauging heads which are adapted to receive the inner race, said heads having fluid leakage passages controlled by the raceways to provide a measurable leakage of fluid supplied under pressure, an operating bar on said support and means pivotably supporting said bar on said support at one side of said carrier for engaging and moving one side of the inner race, while on said gauging heads, generally axially of the outer race and into a definite predetermined position in which the spacing between the raceways corresponds to the spacing that normally exists in said races when the same are assembled.

10. A gauging apparatus as set forth in claim 8 in which the arms are at least three in number and are equally spaced apart about a point, one of the arms being mounted for movement on the carrier in a direction towards and from said point.

11. A gauging apparatus as set forth in claim 8 in which at least one of the spaced arms is mounted for limited movement on the carrier in a direction radially of the part carried by said arms.

References Cited in the file of this patent

UNITED STATES PATENTS

| Number | Name | Date |
|---|---|---|
| 2,419,280 | Neff | Apr. 22, 1947 |
| 2,431,014 | Aller | Nov. 18, 1947 |
| 2,431,087 | Subber | Nov. 18, 1947 |

FOREIGN PATENTS

| Number | Country | Date |
|---|---|---|
| 50,044 | Sweden | Aug. 25, 1919 |